(12) United States Patent
Agrawal

(10) Patent No.: US 7,447,495 B2
(45) Date of Patent: *Nov. 4, 2008

(54) METHODS AND SYSTEMS FOR PROVIDING APPLICATION LEVEL PRESENCE INFORMATION IN WIRELESS COMMUNICATION

(75) Inventor: Anuraag Agrawal, Bellevue, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/872,629

(22) Filed: Oct. 15, 2007

(65) Prior Publication Data

US 2008/0034034 A1 Feb. 7, 2008

Related U.S. Application Data

(63) Continuation of application No. 09/989,311, filed on Nov. 20, 2001, now Pat. No. 7,283,805.

(60) Provisional application No. 60/249,982, filed on Nov. 20, 2000.

(51) Int. Cl.
H04M 1/663 (2006.01)
(52) U.S. Cl. .................. 455/412.2; 455/463; 455/466; 709/203; 709/219
(58) Field of Classification Search .............. 455/412, 455/412.1, 412.2, 414.1–414.4, 442.1, 442.2, 455/445, 461–463, 466, 467, 550.1; 709/202–207, 709/218, 219, 225–227, 229
See application file for complete search history.

(56) References Cited

U.S. PATENT DOCUMENTS 5,315,636 A 5/1994 Patel 5,493,692 A 2/1996 Theimer et al.

(Continued)

FOREIGN PATENT DOCUMENTS

EP 1021021 7/2000

(Continued)

OTHER PUBLICATIONS

Silver et al., "Unified network presence management," Session #WS2, 6 pages, May. 21, 2000.

(Continued)

*Primary Examiner*—Nhan T Le
(74) *Attorney, Agent, or Firm*—Davis Wright Tremaine LLP; Michael J. Donohue; Heather M. Colburn

(57) ABSTRACT

Methods and apparatus for determining and maintaining user presence information include capturing user presence data with an application presence server. The application presence server can be configured to update user presence data as a user initiates or exits an application. Applications associated with user presence data are configured to query an application proxy client concerning user presence data of a selected user and, based on a returned user status, deliver, discard, or redirect a message intended for the user. User presence data is stored in a user presence repository and can be provided via Internet-based or other connections to applications executed on external networks. User activity status can be used to select or update user presence data. In some examples, an application server of an external network is configured to receive user presence data from the presence server.

13 Claims, 15 Drawing Sheets

U.S. PATENT DOCUMENTS

| | | | |
|---|---|---|---|
| 5,754,774 A | | 5/1998 | Bittinger et al. |
| 5,796,393 A | | 8/1998 | MacNaughton et al. |
| 5,839,067 A | * | 11/1998 | Jonsson .................. 455/432.3 |
| 6,049,713 A | | 4/2000 | Tran et al. |
| 6,157,831 A | | 12/2000 | Lamb |
| 6,161,006 A | | 12/2000 | Balachandran |
| 6,175,869 B1 | * | 1/2001 | Ahuja et al. ................ 709/226 |
| 6,301,609 B1 | | 10/2001 | Aravamudan et al. |
| 6,430,602 B1 | | 8/2002 | Kay et al. |
| 6,430,604 B1 | | 8/2002 | Ogle et al. |
| 6,484,196 B1 | | 11/2002 | Maurille |
| 6,519,639 B1 | | 2/2003 | Glasser |
| 6,529,500 B1 | * | 3/2003 | Pandharipande ........... 370/352 |
| 6,535,743 B1 | | 3/2003 | Kennedy et al. |
| 6,539,421 B1 | | 3/2003 | Appelman et al. |
| 6,606,647 B2 | * | 8/2003 | Shah et al. ................. 709/206 |
| 6,631,398 B1 | * | 10/2003 | Klein ......................... 709/206 |
| 6,714,793 B1 | * | 3/2004 | Carey et al. ................ 455/466 |
| 6,807,565 B1 | | 10/2004 | Dodrill et al. |
| 6,839,737 B1 | | 1/2005 | Friskel |
| 6,988,128 B1 | | 1/2006 | Alexander et al. |
| 7,283,805 B2 | * | 10/2007 | Agrawal ................. 455/412.2 |
| 2001/0013069 A1 | | 8/2001 | Glasser et al. |
| 2001/0034224 A1 | | 10/2001 | McDowell et al. |
| 2001/0042126 A1 | | 11/2001 | Wong et al. |
| 2002/0007398 A1 | | 1/2002 | Mendiola et al. |
| 2002/0021307 A1 | | 2/2002 | Glenn et al. |
| 2002/0035605 A1 | | 3/2002 | McDowell et al. |
| 2002/0065894 A1 | | 5/2002 | Dalal et al. |
| 2004/0117443 A1 | | 6/2004 | Barsness |
| 2008/0034033 A1 | * | 2/2008 | Agrawal ..................... 709/203 |

FOREIGN PATENT DOCUMENTS

| | | |
|---|---|---|
| WO | WO9831167 | 7/1998 |
| WO | WO9831181 | 7/1998 |
| WO | WO9933309 | 7/1999 |
| WO | WO9948011 | 9/1999 |

OTHER PUBLICATIONS

Appenzeller et al., "The mobile people architecture," Technical Report: CSL-TR-00000, Stanford University, 13 pages, 1999.

Caslyn and Desseault, "Presence information protocol requirements," Internet Draft, Microsoft Corporation, 13 pages, Feb. 9, 1998.

E.T. Surf Home: Mirabilis Ltd. Provides New Solutions for Peer-to-Peer Internet Communications, URL: http://www.icq.com/press/press_release2.html [November 14, 2002].

Instant Gratification CNET Compares 6 Top Instant-Messaging Programs, URL: http://222.cnet.com/software/0,10000,0-5566362-7-278364,00.html [November 14, 2002].

* cited by examiner

METHODS AND SYSTEMS FOR PROVIDING APPLICATION LEVEL PRESENCE INFORMATION IN WIRELESS COMMUNICATION

RELATED APPLICATIONS

This application claims the benefit of U.S. application Ser. No. 09/989,311, now U.S. Pat. No. 7,283,805, which claims the benefit of U.S. Provisional Application No. 60/249,982, filed Nov. 20, 2000.

BACKGROUND AND SUMMARY

Internet-based instant messaging applications have become popular for use in communication with selected other users without the delays associated with conventional electronic mail. In a typical instant messaging application, a user prepares a message for delivery to one or more other users, typically on a so-called "buddy list," and then transmits the message for immediate delivery. The user receives messages from members of the buddy list in a similar manner.

Instant messaging is generally based on the availability of a potential message recipient. Unlike email in which message delivery and response delays are customary, instant messaging is based on immediate response, and it is generally undesirable to send instant messages to a user who receives the messages hours or days later. Accordingly, methods and apparatus for determining user availability are needed for instant messaging.

Networks are provided that include an application server configured to communicate with a first client and a presence server configured to receive application presence data associated with the first client from the application server. According to representative examples, the application server is configured to communicate with a second client based on the application presence data associated with the first client. According to additional examples, the application server is configured to deliver a message from the second client to the first client based on the application presence data associated with the first client and at least one of the first client and the second client is associated with a mobile station. In further illustrative embodiments, the application server is configured to provide application presence data to an external application server.

Systems and methods are provided that are configured to provide application level presence data for wireless network applications, such as instant messaging (IM). Presence data indicates whether a user is available on a particular device in a wireless network. According to some examples, when a user employs a device to initially access an application, the application registers the device's presence information as "active," and the application monitors the user's activity on the device. If there is no activity for a configurable amount of time, the application sends out a notification such as, a wireless application protocol (WAP) push, to the device. If the device accepts the notification, the presence information remains "active." If the device does not accept the notification and the notification is queued in the gateway, then the presence information is changed to "inactive" or other value.

Messaging methods include selecting a message for delivery to at least one selected recipient. Application presence data associated with the recipient is evaluated, and the message is processed based on the evaluation. According to representative examples, presence data is obtained from a presence repository or from an application server. In illustrative embodiments, the message is delivered to the selected recipient if the evaluation indicates that the recipient is available. In other examples, the message is discarded if the evaluation indicates that the recipient is unavailable or redirected to a destination selected based on the evaluation.

According to additional examples, communication systems include an application server in communication with a client and configured to provide a selected application. An activity repository is configured to retain a user activity status associated with interaction of the client with the selected application. In some examples, an application presence server is configured to determine user presence data with respect to the selected application and such presence data can be provided based on user activity status.

These and other features and advantages are set forth below with reference to the accompanying drawings.

DETAILED DESCRIPTION

Figure 1:
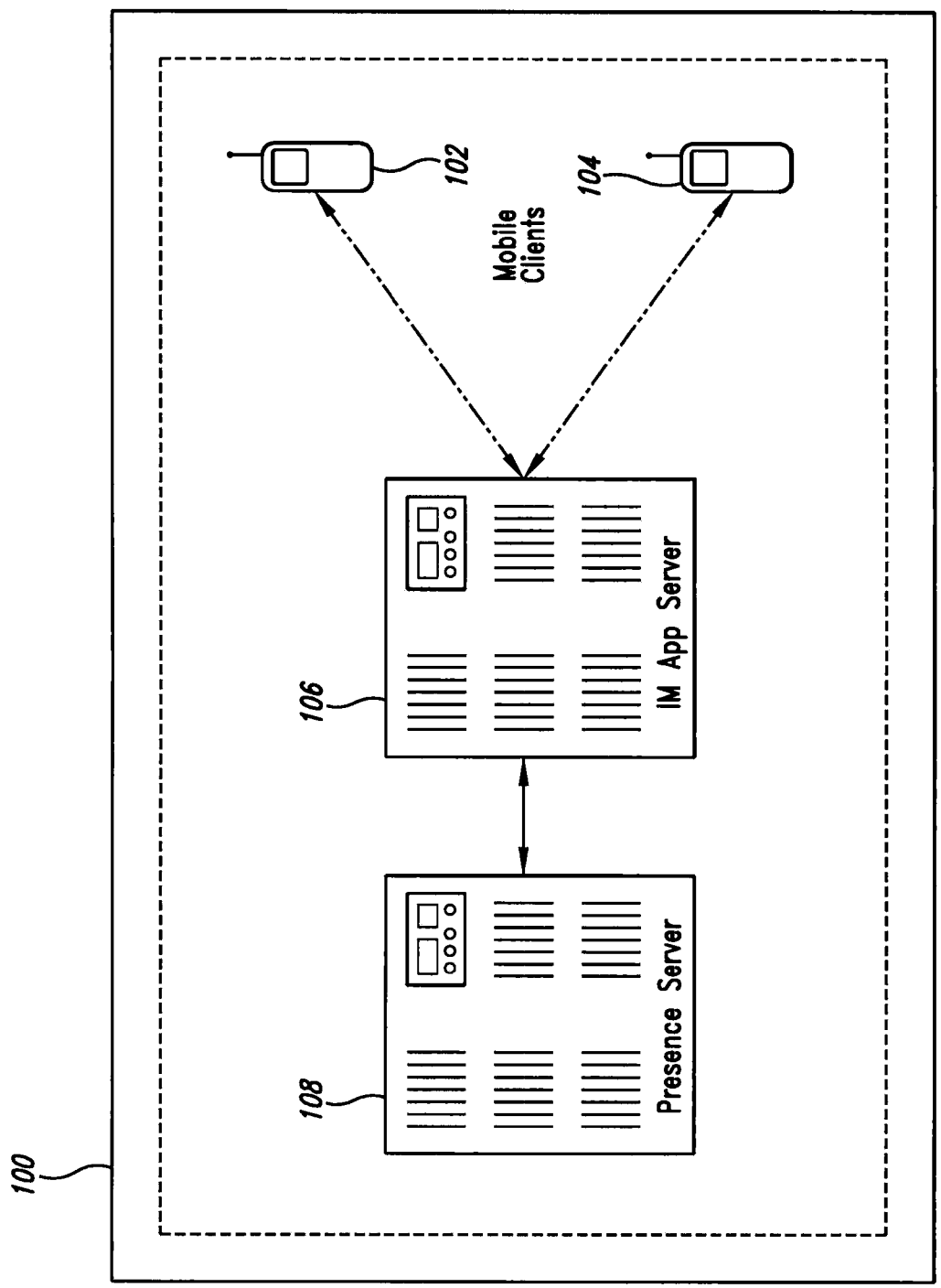
FIG. 1 is a block diagram illustrating a communication system that includes mobile stations and a presence server configured to provide user presence data.

With reference to FIG. 1, a wireless communication network 100 includes mobile clients 102, 104 that use mobile communication devices such as, for example, cell phones or personal digital assistants. The mobile clients 102, 104 are in communication with an application server 106 that is configured to provide, for example, instant messaging or other application services. A presence server 108 is in communication with the application server 106 and is configured to provide user presence data to the application server 106. The presence server 108 can be configured to receive user presence data based on a cellular digital packet data (CDPD) presence agent or a general packet radio service (GPRS) presence agent, or presence data can provided by an application presence component situated at the application server 106.

As shown in FIG. 1, instant messaging can be provided between the mobile clients 102, 104 based on user presence data supplied by the presence server 108. For example, initiation of an application by the mobile client 102 is communicated to the presence server as a user presence "available." After the application is initiated, subsequent user presence data is used to update the presence server data to other presence conditions, such as, unavailable, reachable, unreachable, or others. For example, additional uses of the application can produce presence updates (such as log off) that are communicated to the presence server 108. The application can be configured to provide presence updates at regular or random time intervals. In wireless networks based on, for example, cellular digital packet data (CDPD), application presence data can be limited by CDPD sleep mode interval. Cell phones are typically configured to enter a so-called "sleep mode" after a predetermined time interval to preserve battery life, and presence data may not reflect entry into sleep mode. Alternatively, entry into sleep mode can be configured to provide an associated presence data update to the presence server. Alternatively, the user can select to use network presence data to supplement or replace user application presence data.

Figure 2A:
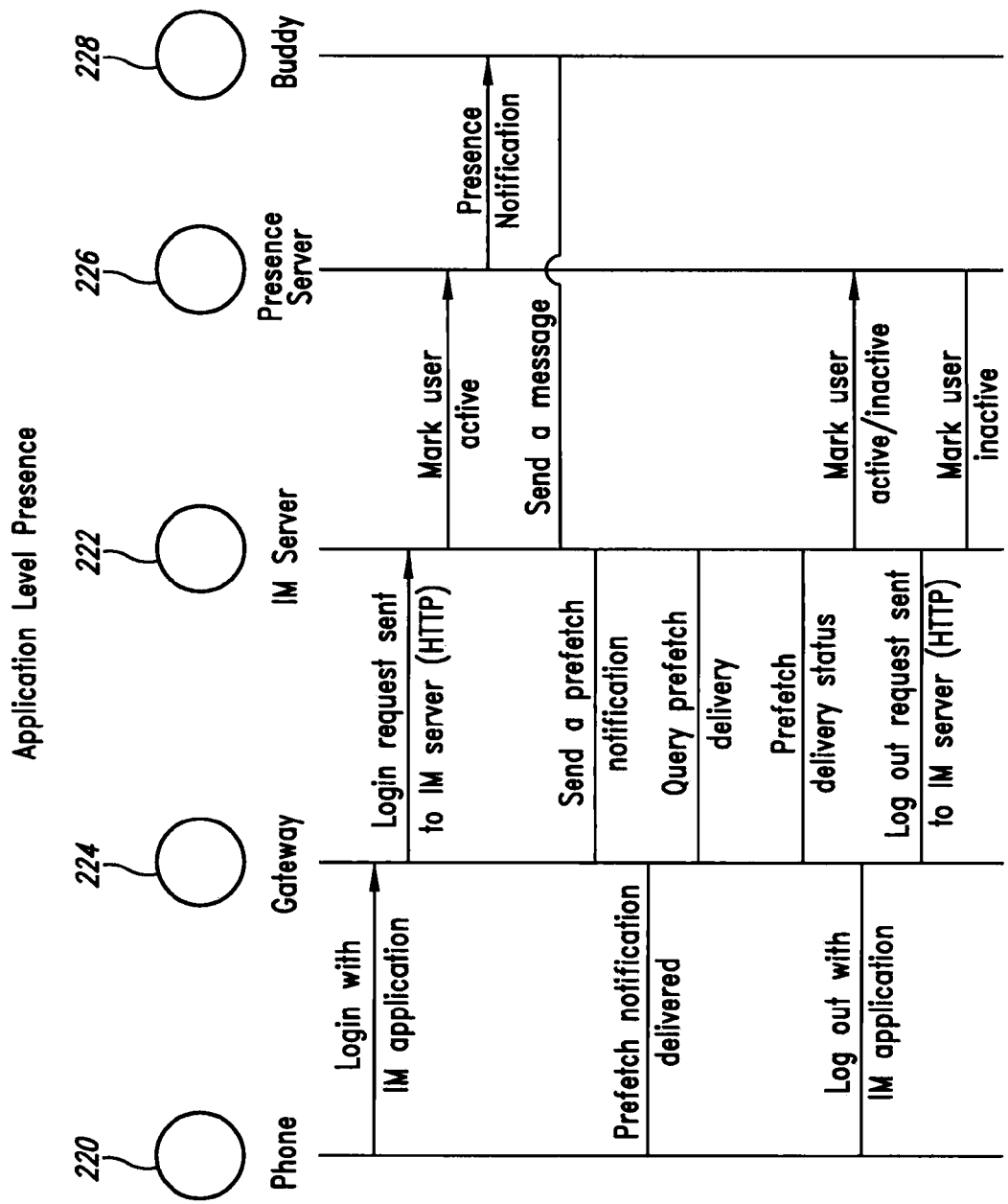
FIG. 2A is a diagram illustrating capture of user application presence data.

FIG. 2A illustrates acquisition and updating of application level user presence data. A mobile station 220 (typically a cell phone) initiates or "logs in" to an instant messaging (IM) application at an IM application server 222 through a gateway 224. The IM application server 222 communicates that the user is active to a presence server 226 and a presence notification is delivered to a selected contact, typically a so-called buddy 228, i.e., a user who is a member of a "buddy list." When the mobile station 220 exits the IM application (logs out), the log out request is delivered to the IM application server 222 and the user application presence is changed to indicate that the user is inactive. The buddy 228 delivers a message to the mobile station 220 by sending the message to the IM application server 222. A prefetch notification is delivered to the mobile station 220 and based on a prefetch delivery query and prefetch delivery status, the message is delivered and/or user application presence can be changed to, for example, inactive.

Figure 2B:
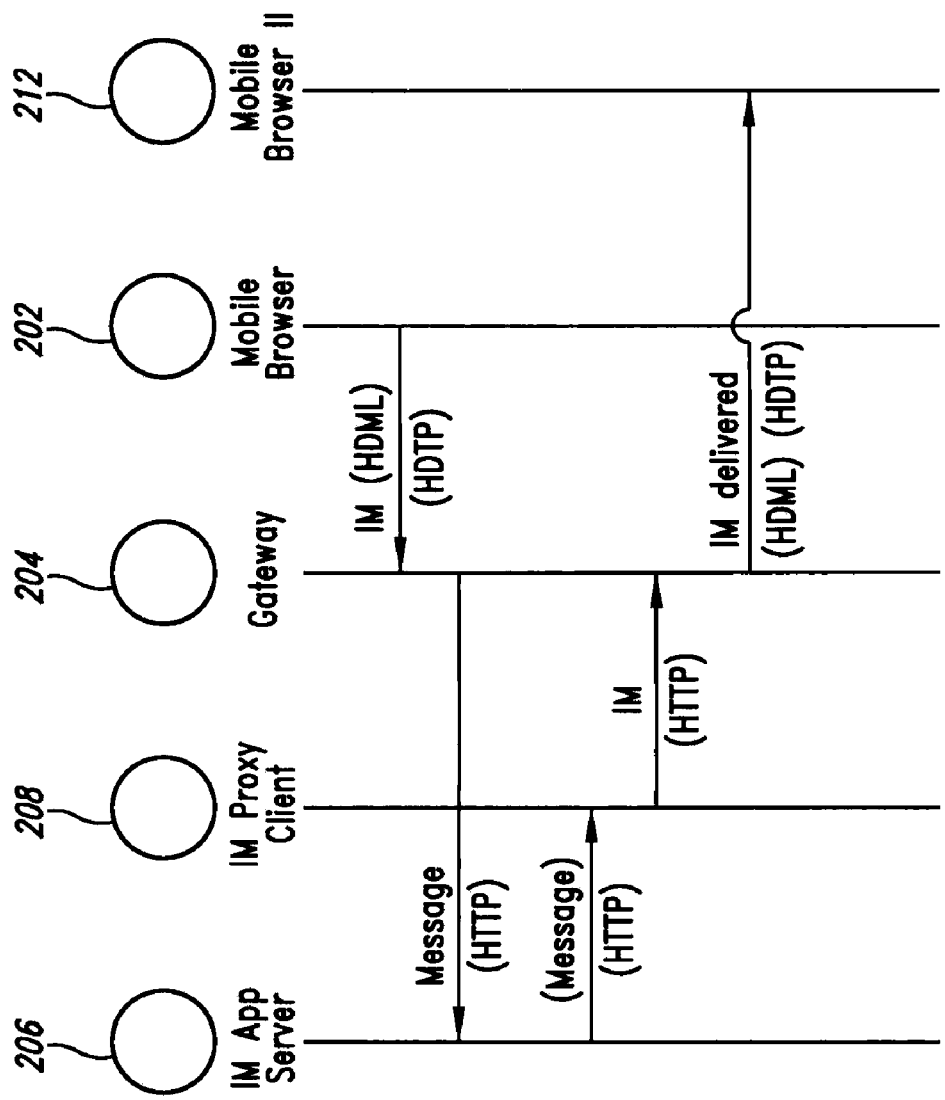
FIG. 2B is a diagram illustrating instant messaging in a communication system similar to the communication system of FIG. 1.

FIG. 2B illustrates communication based on a communication network such as the communication network 100 of FIG. 1. A mobile client delivers an instant message (IM) using an application such as a mobile browser 202 that is configured to execute on a mobile communication device. The mobile browser 202 delivers the instant message using a handheld device transfer protocol (HDTP) and a handheld device markup language (HDML), or a wireless application (WAP) protocol and a wireless markup language (WML), or other protocols and languages, to a gateway 204. As shown in FIG. 2, the HDTP/HDML protocol message is delivered in an HTTP protocol to an instant messaging application server 206. The application server delivers the instant message to an instant messaging proxy client 208 and to the gateway 204 that delivers the message in HDTP/HDML protocol to a mobile browser 221 at a second mobile client. Presence information is obtained from a presence server such as the presence server 108 of FIG. 1.

FIG. 1 illustrates instant messaging between two mobile clients, but instant messaging among additional mobile clients can be similarly configured. Applications other than instant messaging can also be provided. In the example of FIG. 1, communication with additional cellular network elements such as a mobile data intermediate system (MDIS) is unnecessary and user presence data need not be based on any changes in an MDIS or other network components. Such a network can be referred to as an internal network as all mobile clients communicate with a single (or similar) application servers, configured to similarly provide user application presence data.

Figure 3:
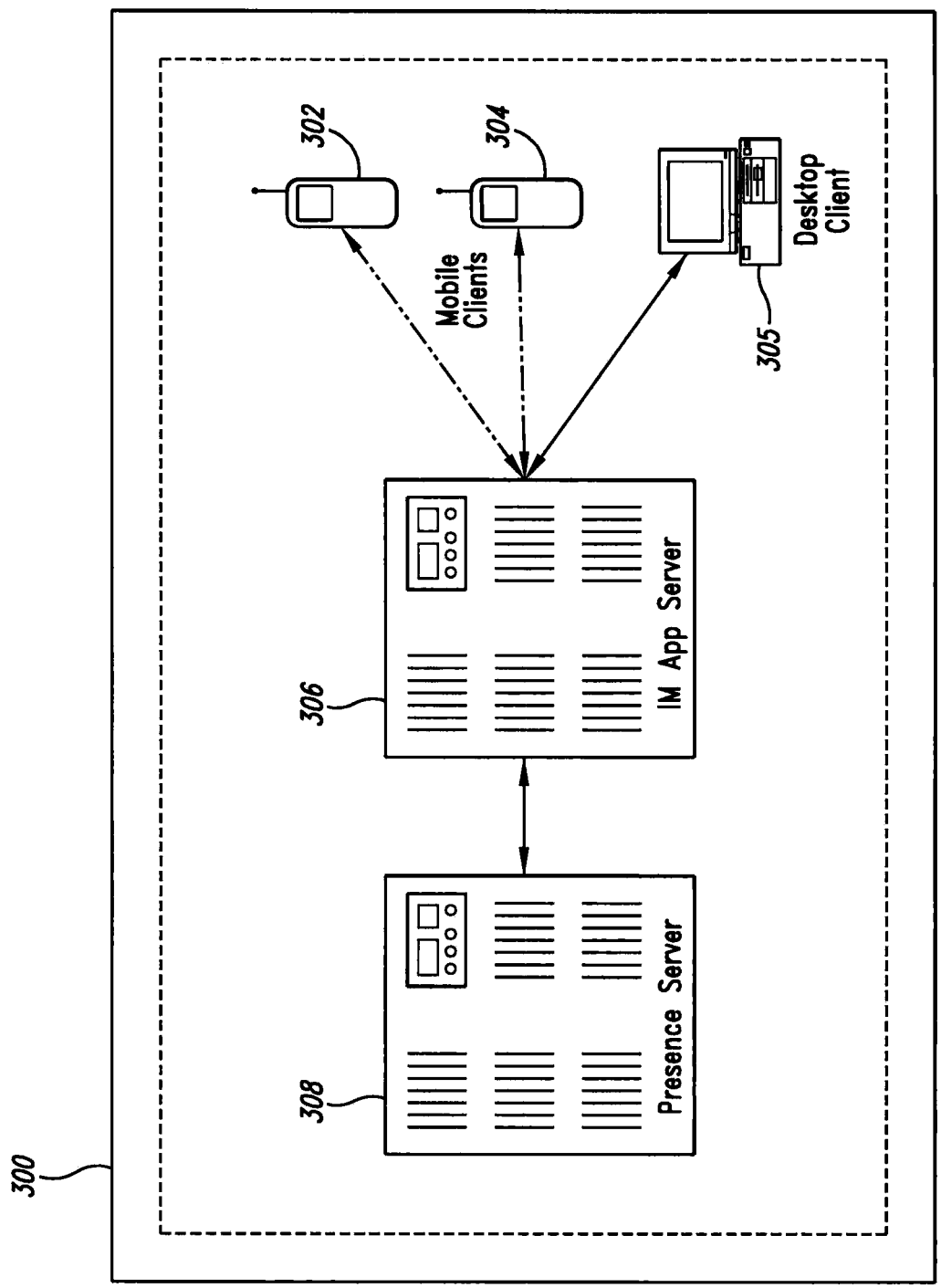
FIG. 3 is a block diagram illustrating a communication system that includes a wireless network having mobile stations, desktop stations, and a presence server configured to provide user presence data.

With reference to FIG. 3, a wireless communication network 300 includes mobile clients 302, 304 that use mobile communication devices such as, for example, cell phones or personal digital assistants, and a desktop client 305 that uses a personal computer or other stationary communication device. The clients 302, 304, 305 are in communication with an application server 306 that is configured to provide, for example, instant messaging or other application services. A presence server 308 is in communication with the application server 306 and is configured to provide user presence data to the application server 306.

Figure 4:
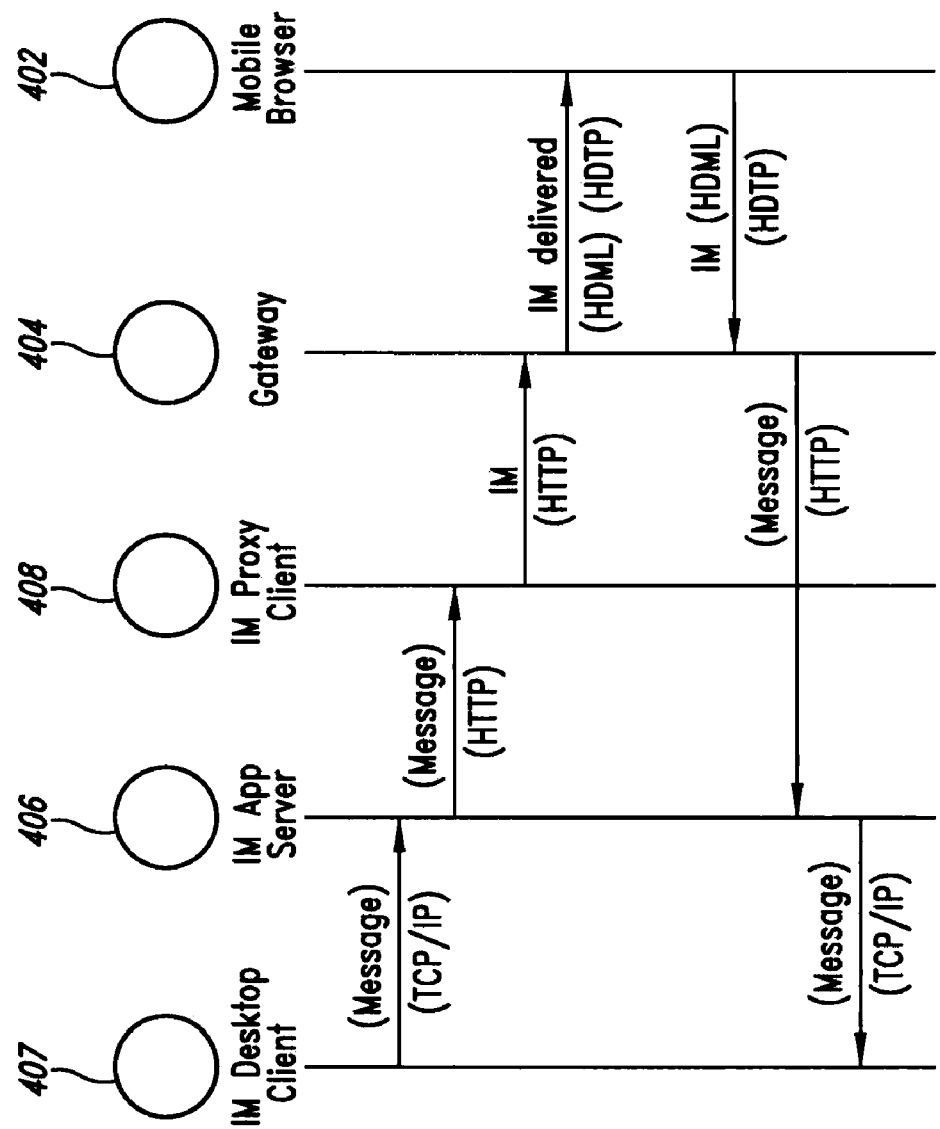
FIG. 4 is a diagram illustrating communication between a mobile browser and a desktop client in a communication system similar to that of FIG. 3.

FIG. 4 illustrates instant messaging based on a network such as the network 300 of FIG. 3. A mobile client delivers an instant message using an application such as a mobile browser 402 that is configured to execute on a mobile communication device. The mobile browser 402 delivers the instant message using a handheld device transfer protocol (HDTP) and a handheld device markup language (HDML) or other protocol to a gateway 404 and to an instant messaging application server 406. The message is then delivered by the application server 406 in a TCP/IP protocol to a desktop client 407. An instant message from the desktop client 407 is delivered to the application server 406 using an TCP/IP protocol and to an application proxy client 408 using an HTTP protocol. The gateway 404 receives the message from the application proxy client 408 and delivers the message to the mobile browser 402. Presence information is captured and/or provided at a presence server, such as the presence server 308 of FIG. 3.

Figure 5:
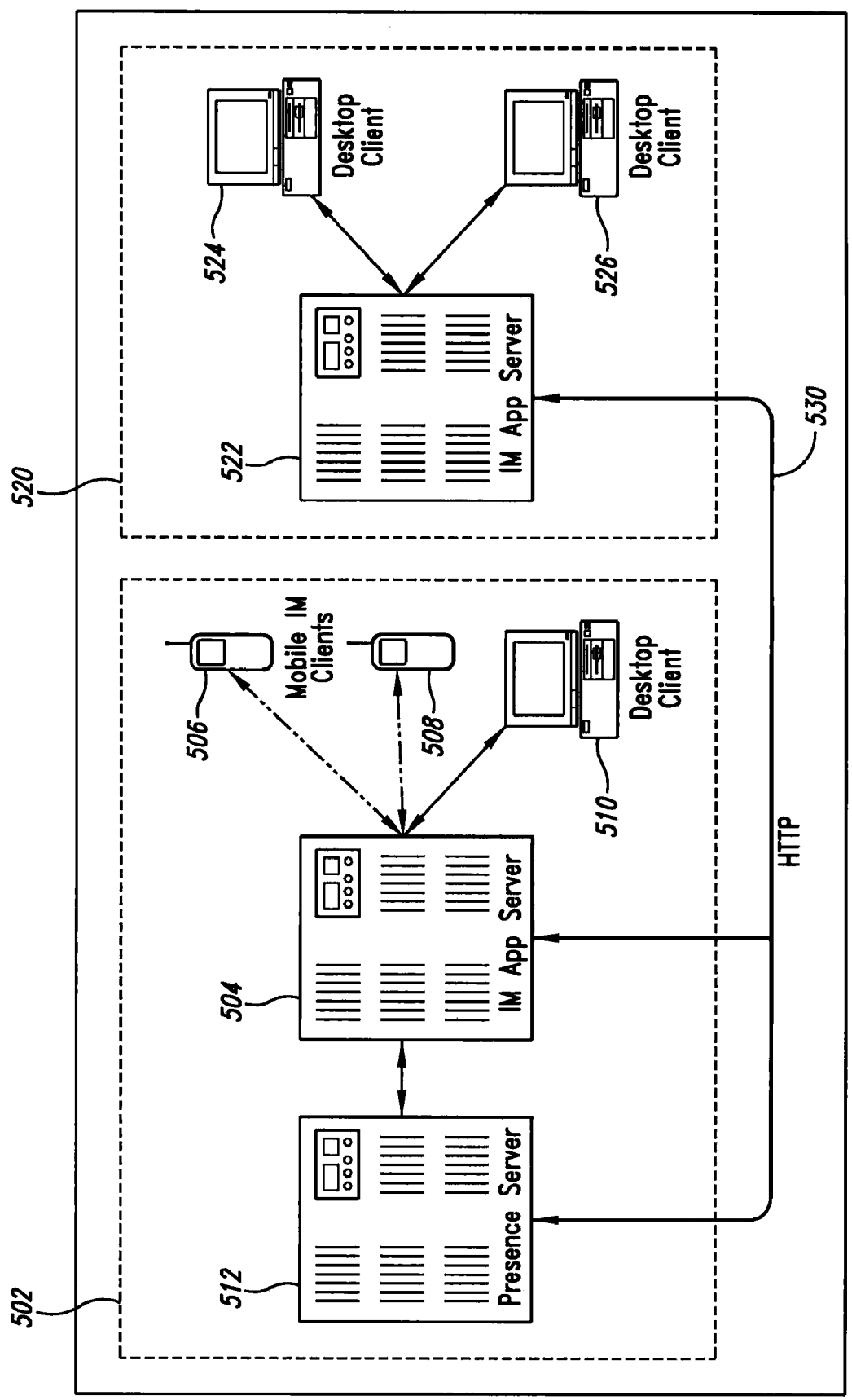
FIG. 5 is a block diagram illustrating a communication system that includes a wireless network and a fixed network, wherein the wireless network includes a presence server.

FIGS. 1-4 illustrate communication between mobile clients and desktop clients configured within a selected wireless network and communication with other networks, either directly, or via a publicly switched telephone network (PSTN) is not shown. FIG. 5 illustrates communication between a wireless network 502 and a fixed network 520. The wireless network 502 includes an application server 504 that is in communication with mobile clients 506, 508 and a desktop client 510. A presence server 512 is configured to provide presence data concerning mobile or desktop clients. The fixed network 520 includes an application server 522 and desktop clients 524, 526. An HTTP connection 530, or other connection, is provided for communication between the wireless network 502 and the fixed network 520.

The networks 502, 520 can communicate via the HTTP connection 530 in various ways. For example, the desktop client 524 directs an instant message (M) to the application server 522, and the IM is communicated by the HTTP connection 530 to the application server 504 and the presence server 512. The IM can be in various formats such as plain text, MIME encoded, binary, or other formats. For example, the mobile client 506 typically receives the IM from an instant messaging proxy (or other application proxy) as an HDML formatted message. The application server 504, based on user presence data from the presence server 512, delivers the IM to an appropriate client at an associated location, or can halt delivery, or return the IM to the desktop client 524.

Figure 6A:
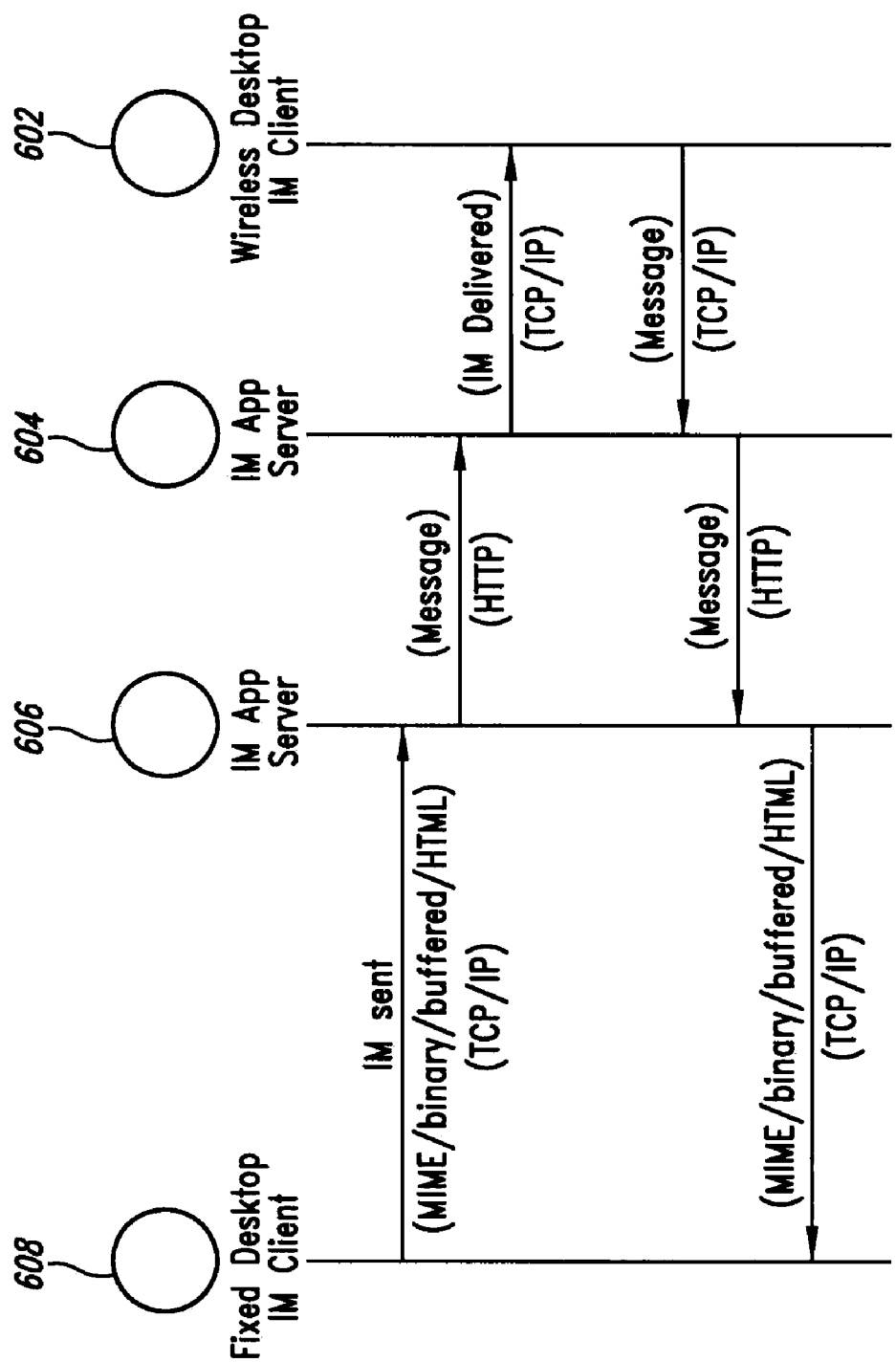
FIG. 6A is a diagram illustrating communication between a wireless network desktop client and a fixed desktop client in a communication system similar to the communication system of FIG. 5.

FIG. 6A illustrates instant messaging between a desktop client in a wireless network and a desktop client in a fixed network based on a network similar to the network of FIG. 5. A wireless desktop client 602 delivers a message to a wireless IM application server 604 in, for example, TCP/IP format. The wireless IM application server 604 delivers the message to a fixed wireless application server 606, typically in an HTTP format, and the message is received by a fixed desktop client 608 using MIME, binary, HTML, TCP/IP, or other format and protocols. The fixed desktop client 608 delivers a message to the wireless desktop client 602 via the fixed application server 606 and the wireless application server 604. Delivery of messages by the application servers 604, 606 can be based on user presence data so that messages are delivered, returned, stored, discarded, or otherwise processed based on message content and user presence.

Figure 6B:
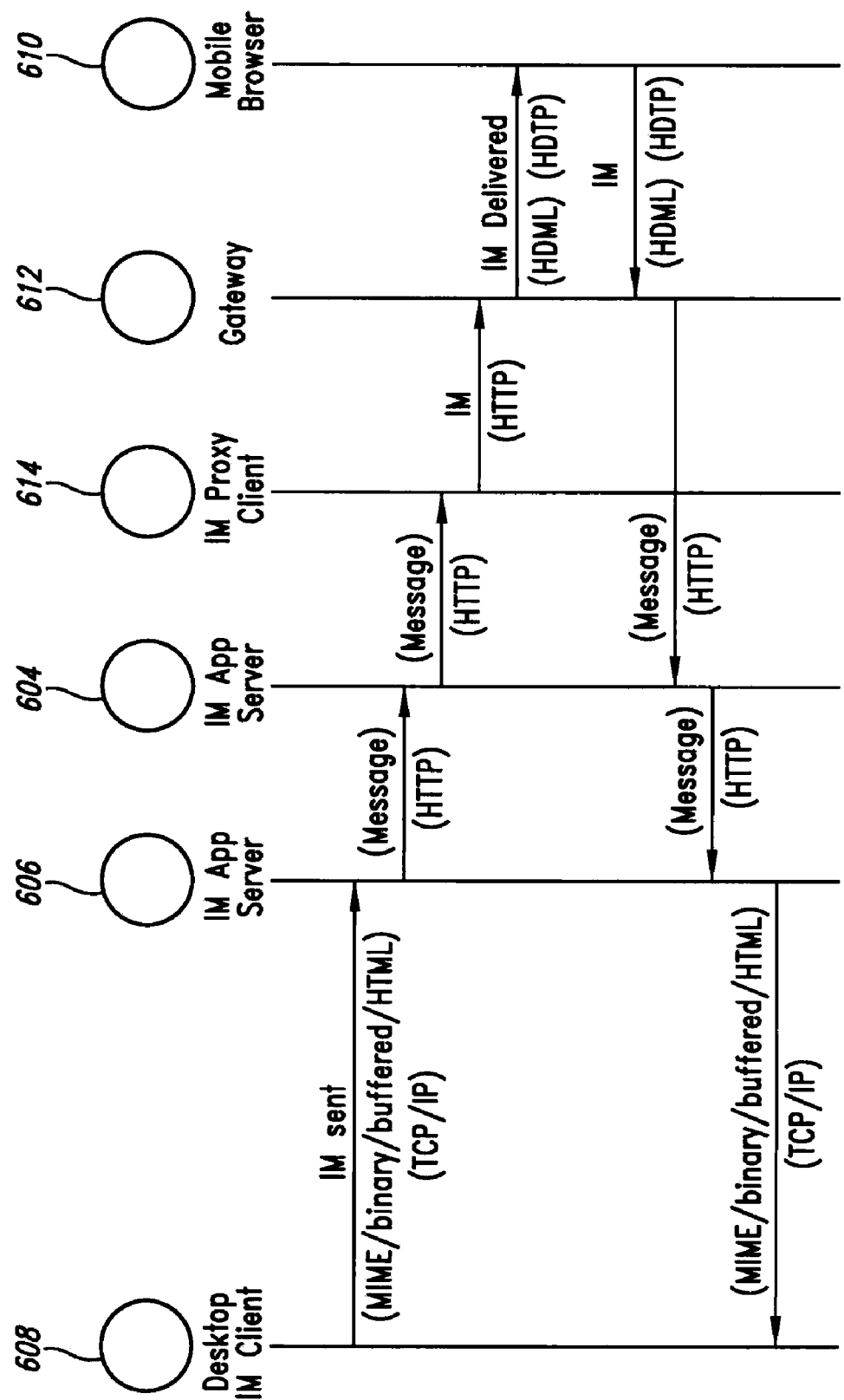
FIG. 6B is a diagram illustrating communication between a mobile browser and a fixed desktop client in a communication system similar to the communication system of FIG. 5.

FIG. 6B illustrates communication between the desktop client 608 of the fixed network and a mobile client using a mobile browser 610. Messages are received from the fixed desktop client 608 via the fixed application server 606 and the wireless application server 604. In addition, a proxy client 614 delivers a message received from the wireless application server 604 in, for example, an HTTP format, to a gateway 612 that delivers the message in, for example, HDML/HDTP format, to the mobile browser 610. As noted above with reference to FIG. 6A, message delivery can be based on user presence information obtained from a user presence server so that messages are discarded, stored, delivered, or otherwise processed based on user presence information.

The network configuration illustrated in FIGS. 5, 6A-6B permits a network that includes a presence server to provide presence data to applications supported by other networks, even if such networks do not capture user presence data. Typically, these external networks are configured to receive user presence data from a presence server of another network. Alternatively, two or more networks can capture and share presence data.

Figure 7:
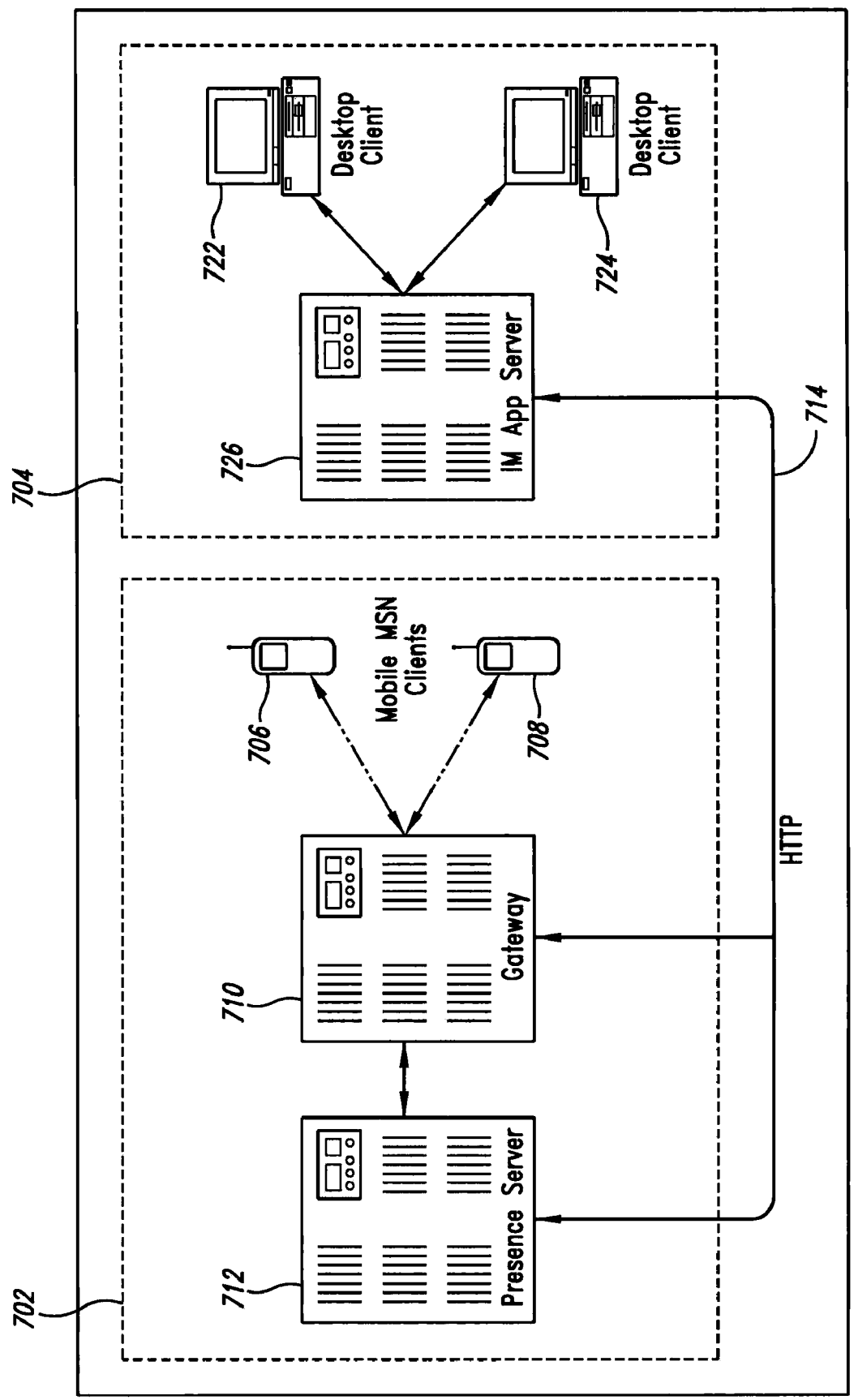
FIG. 7 is a block diagram illustrating a communication system that includes a wireless network having mobile clients of a fixed network configured to communicate with the fixed network via the wireless network.

FIG. 7 illustrates a communication network 700 that includes a wireless network 702 and a fixed network 704. Mobile clients 706, 708 communicate with a wireless network gateway 710 that is in communication with a presence server 712. The network gateway 710 and the presence server 712 are configured to communicate with the fixed network 704 using an HTTP-based connection 714, or other connection. The fixed network 704 includes desktop clients 722, 724 and an application server 726.

Figure 8:
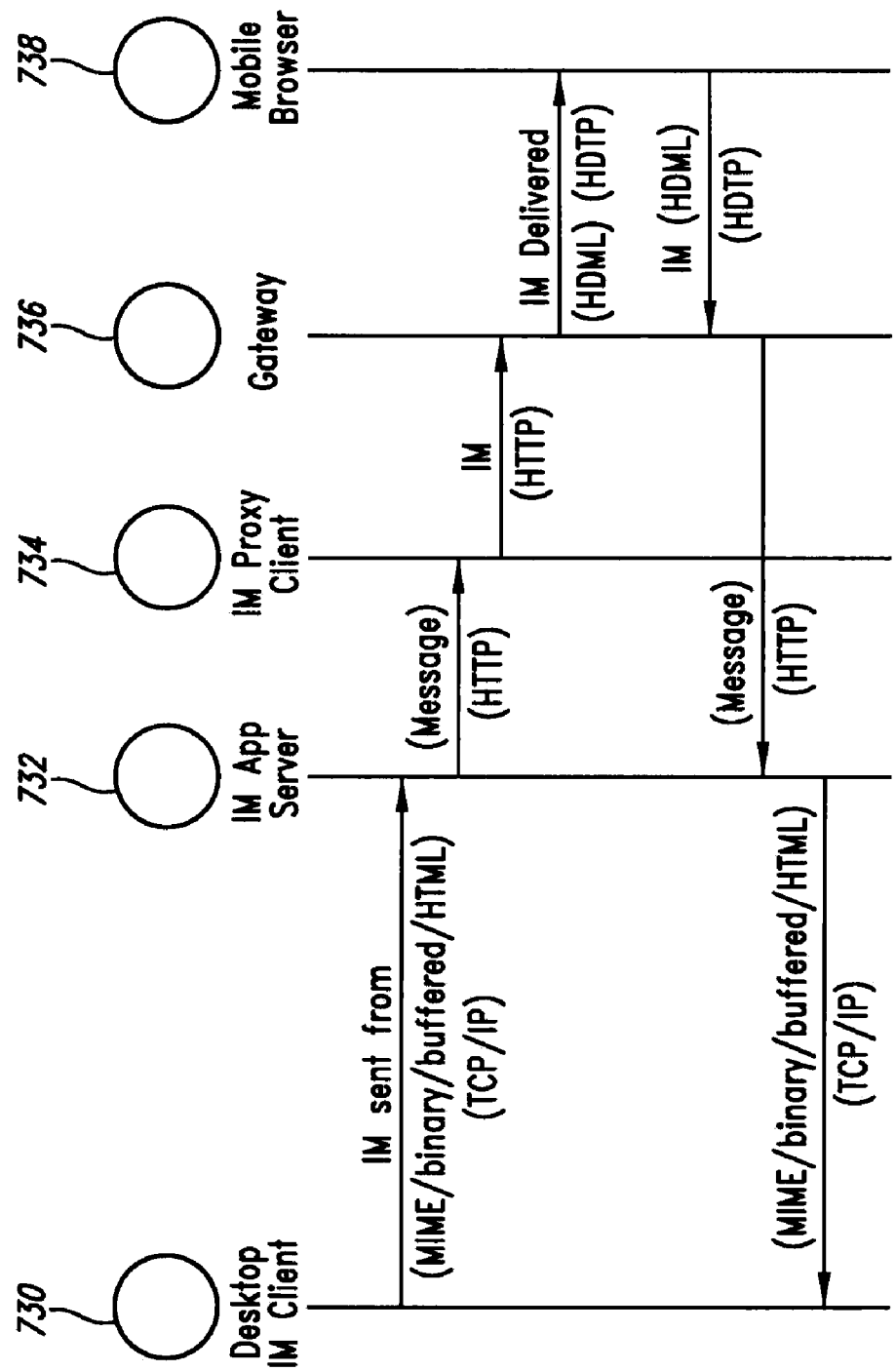
FIG. 8 is a diagram illustrating instant messaging between a fixed desktop client and mobile browser executed by a mobile client of the fixed network in a communication system similar to the communication system of FIG. 7.

The mobile clients 722, 724 are configured to transmit and receive messages as shown in FIG. 8. A fixed desktop IM client 730 communicates with a fixed application server 732 using a MIME, binary, HTML or other format based on a TCP/IP protocol. The application server 732 delivers messages to a proxy client 734 and then to a gateway 736 and a mobile browser 738. The gateway 736 typically provides messages to the mobile browser 738 in an HDML/HDTP format. The fixed application server 732 receives messages from the gateway 736, and the gateway 736 typically provides messages in an HTTP format based on messages received in HDML/HDTP format.

As shown in FIGS. 7-8, user presence data concerning mobile clients is provided to an external, fixed network by a presence server of the wireless network 702. This user presence data can be supplied to any external network, and message handling in the external network can be based on user presence data from the wireless network. Such a configuration can be referred to as an external application network, as application presence data is captured by a first network for use by an application executing within a second network. A subscriber of the first network need not subscribe to, for example, an instant messaging application of the first network.

Figure 9:
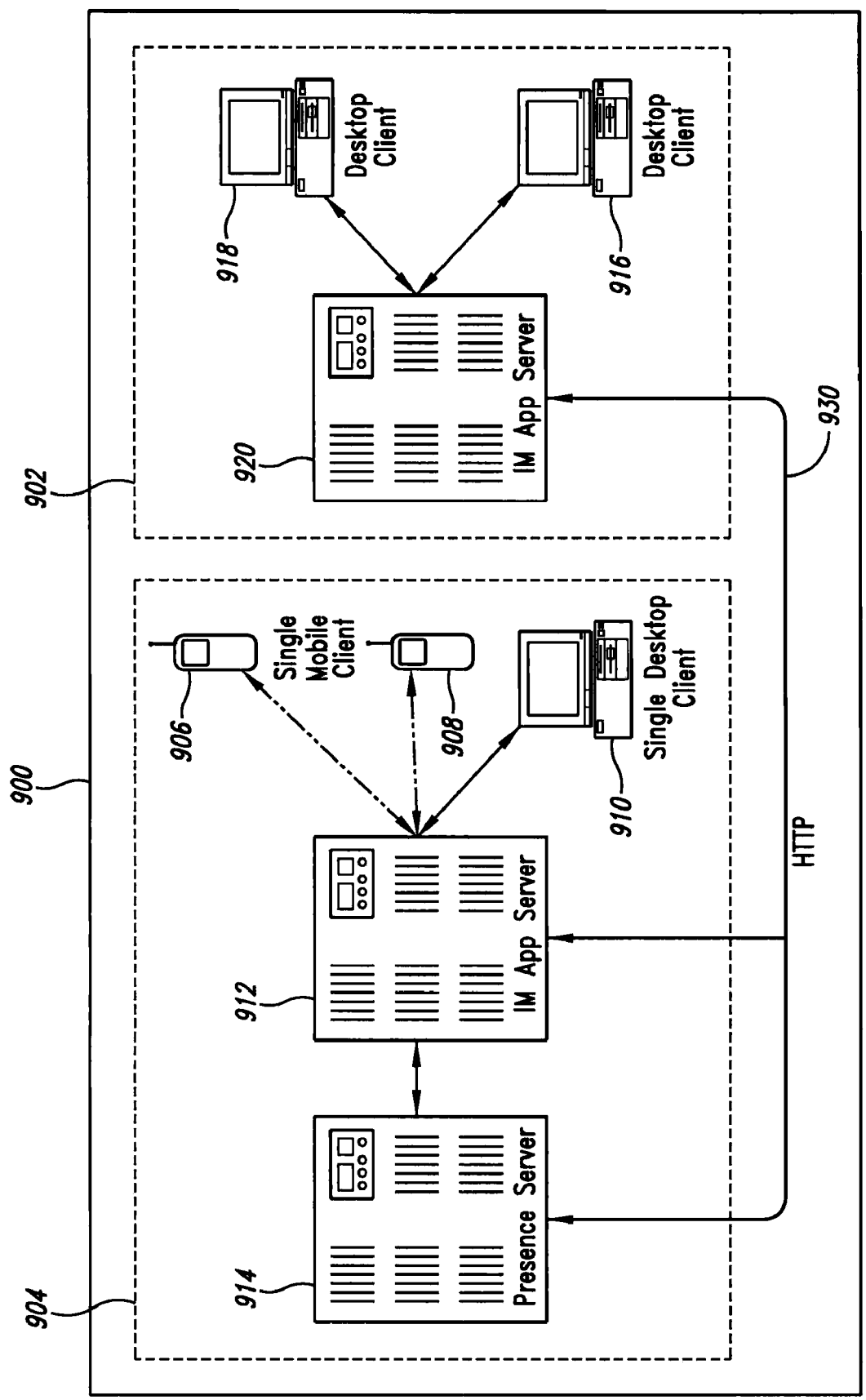
FIG. 9 is a block diagram illustrating a communication system that includes a wireless network having mobile clients of a fixed network configured to communicate with the fixed network via the wireless network.

FIG. 9 illustrates a communication system 900 that includes a fixed network 902 and a wireless network 904. Mobile clients 906, 908 are configured for both the fixed network 902 and the wireless network 904 and can exchange instant messages with clients of either network. The wireless network 904 also includes a desktop client 910 configured for both networks, a wireless application server 912, and a presence server 914. The fixed network 902 includes desktop clients 916, 918 and a fixed application server 920, and the networks 902, 904 communicate via an HTTP-based interconnection 930.

Figure 10:
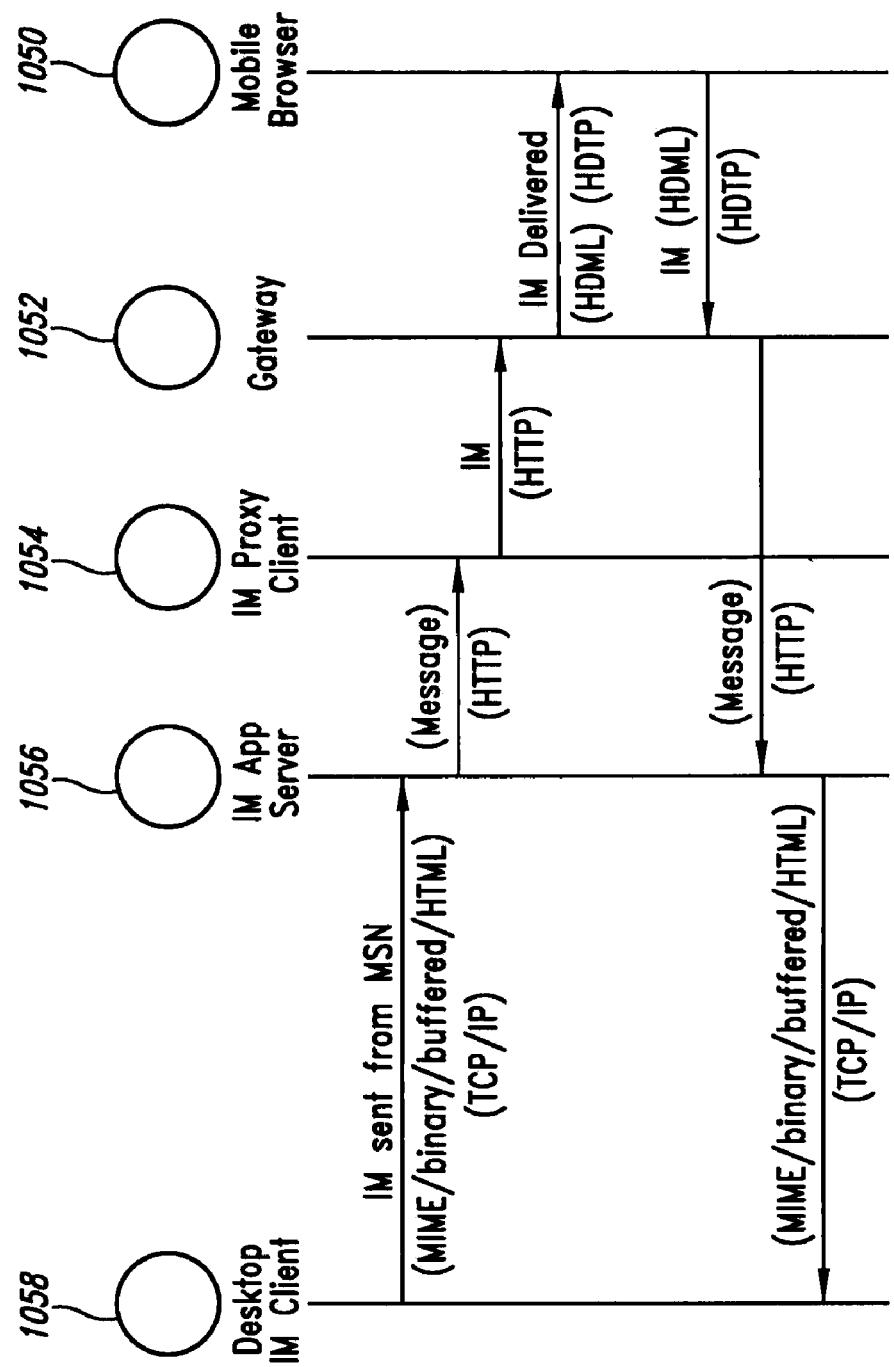
FIG. 10 is a diagram illustrating instant messaging between a fixed desktop client and mobile browser executed by a mobile client in a communication system similar to the communication system of FIG. 9.

FIG. 10 illustrates communication based on a system such as that shown in FIG. 9. Messages are transmitted to and from a mobile browser 1050 via a gateway 1052, a proxy client 1054, and a fixed application server 1056. A fixed desktop client 1058 communicates with the mobile browser via the fixed application server 1056. As shown in FIG. 10, message delivery is based on user presence data from the wireless network that is supplied to the fixed application server 1056. However, message delivery can also be based on user presence data from the wireless network that is supplied to the wireless application server. In such systems, user presence data can be supplied to the network that obtains such data, as well as other networks that are in communication with the presence data originating network. Thus, users can maintain, for example, buddy lists and other application specific lists based on various applications and take advantage of user presence data obtained by a selected network that supports a particular application. In addition, applications can be configured to use or provide user presence data in a standard manner.

The network of FIGS. 9-10 is configured so that users can be clients of applications in a two or more networks and associated application servers, and, for example, a mobile client of the network 904 can maintain connections to the application server 912 and the application server 920. Such a configuration can be referred to as an interoperable configuration.

User presence data can be used in various applications. For example, a buddy list can be presented to an instant messaging user to identify members of the buddy list that are currently available. Alternatively, user presence data can be configured to indicate when a user will become available, or if a user is reachable, but not currently available. User presence data can be configured to provide alerts as users log on or off an application such as an instant messaging application, or designate an address for message delivery. For example, user presence could indicate that a user is available by cell phone and currently unavailable by desktop. In addition, user presence data can include cell phone status such as data or voice mode indications and applications configured to transmit messages appropriately.

Figure 11:
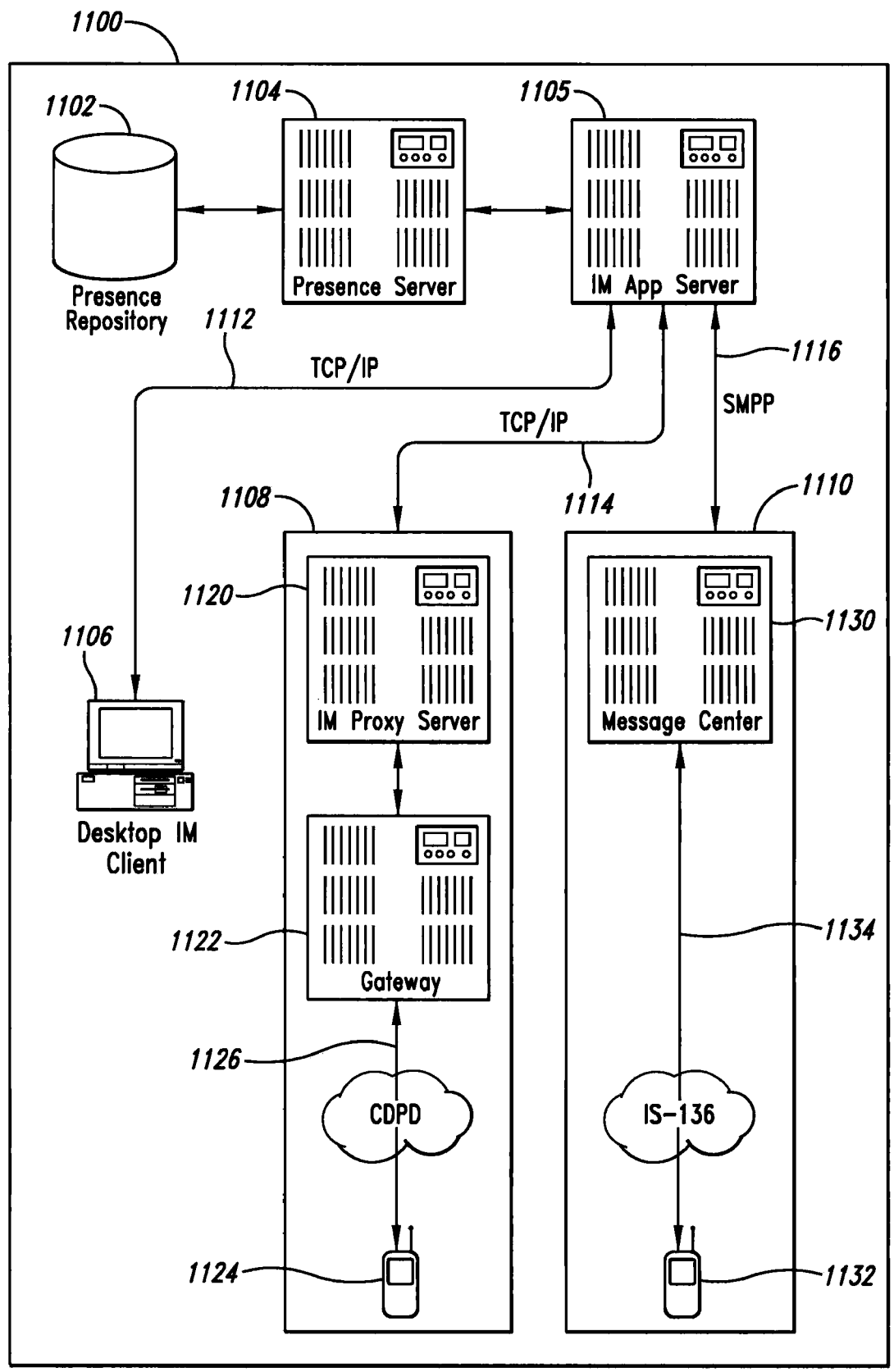
FIG. 11 illustrates delivery of an instant message.

Delivery of instant messages is illustrated in FIG. 11. A communication system 1100 includes a presence repository 1102, a presence server 1104, and an IM application server 1105 that is configured to communicate with a desktop IM client 1106, a wireless network 1108, and a wireless network 1110 via TCP/IP connection 1112, TCP/IP connection 1114, and a short-message peer-to-peer protocol (SMPP) connection 1116, respectively. The wireless network 1110 is configured based on, for example, an IS-136 standard or otherwise configured and the wireless network 1108 is configured based on a cellular digital packet data (CDPD) configuration, but can be configured in other ways.

The network 1108 includes an IM proxy server 1120 in communication with a gateway 1122 that communicates with a mobile station 1124 via a CDPD connection 1126. The network 1110 includes a message center 1130 in communication with a mobile station 1132 via an IS-136 connection 1134.

If user presence data indicates that a user is unavailable, a message intended for the user is discarded or rerouted and an acknowledgment delivered to the message sender. If the user presence data indicates that a user is available and that the user is connected via the network 1110, a request for a short messaging service (SMS) message is delivered to the message center 1130 and a message is then delivered.

Figure 12:
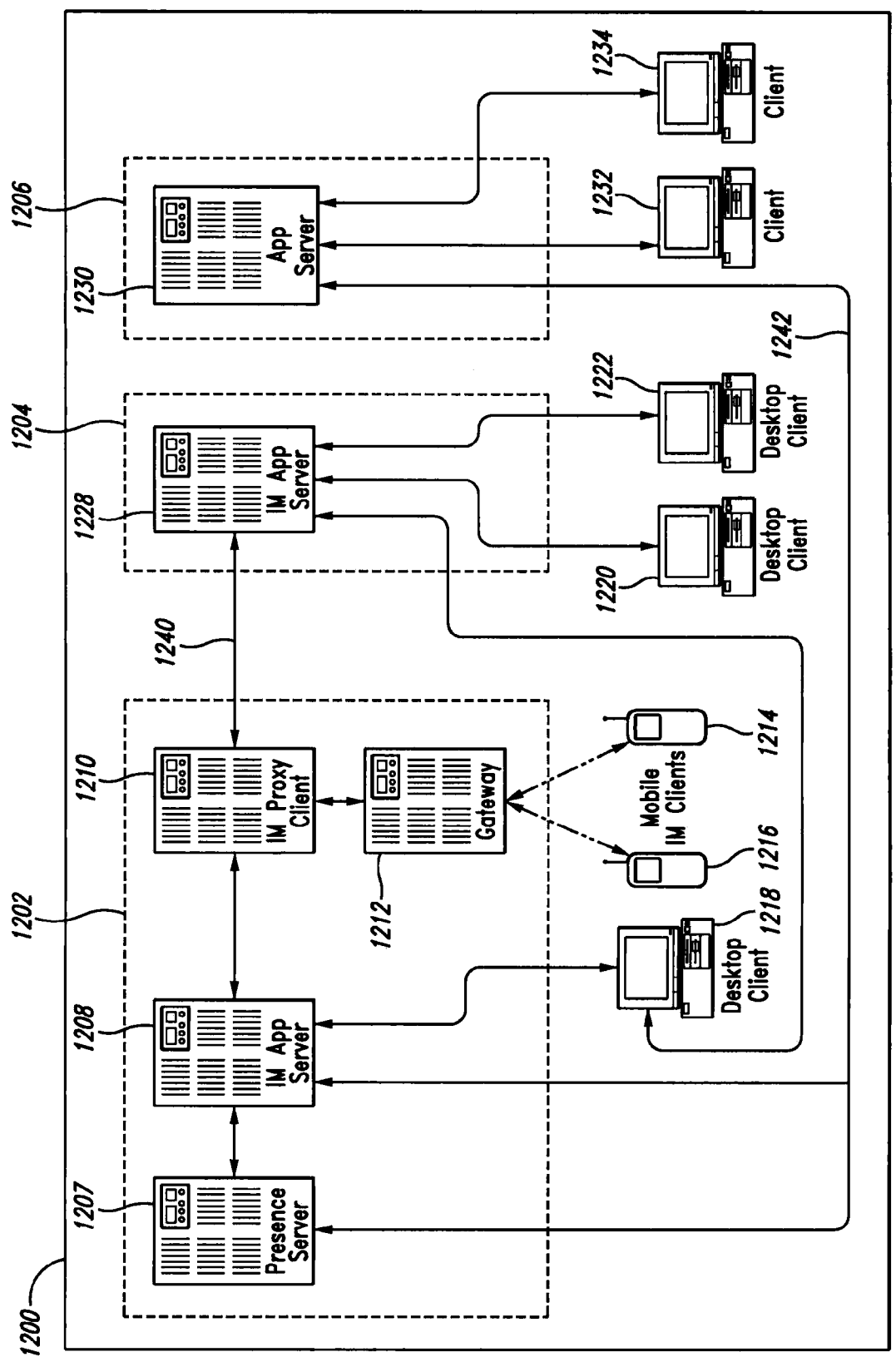
FIG. 12 is a block diagram of communication system that includes three interconnected networks.

FIG. 12 illustrates a network configuration based on an internal (wireless) network 1202, a first external network 1204, and a second external network 1206. The internal network 1202 includes a presence server 1207, an IM application server 1208, an IM proxy client 1210, and a gateway 1212. Mobile clients 1214, 1216 are in communication with the external network 1202 through the gateway 1212. A desktop client is in communication with the IM application server 1208 and an IM application server 1228 of the network 1204. Desktop clients 1220, 1222 of the first external network 1202 are in communication with the application server 1228. The second external network 1206 includes an application server 1230 that is in communication with desktop clients 1232, 1234.

The application server 1228 is configured to receive user presence data from the presence server 1207 via the IM proxy client 1210 based on an application server interconnect 1240. The application server 1230 of the second external network 1206 communicates with the presence server 1207 and the application server 1208 via an interconnection 1242, typically an Internet-based HTTP connection. In addition, the desktop client 1218 communicates directly with the application servers 1208, 1228.

In the example of FIG. 12, the second external network 1205 is configurable to receive user presence data from the network 1202, but generally relies on an Internet-based connection to access the data. The first external network 1204 is configured to communicate directly with the IM proxy client 1210.

Some examples are described above with reference to instant messaging applications, but other applications can be used. For example, applications that provide delivery of time sensitive or time appropriate information such as financial data, advertising, announcements, sports data, news, or other information can be configured based on user presence data obtained from a presence server or a presence repository. As a specific example, financial quotations based on current market conditions can be discarded if user presence data indicates that the user is unavailable or delivered if the user presence data indicates that the user is available. Typically financial quotations that do not reflect current market conditions can be discarded, particularly if the user receives such data in order to select financial transactions for immediate execution. Similarly, travel or advertising data pertaining to a specific event need not be supplied unless the user is available to receive the data before the event occurs. Alternatively, such untimely data can be delivered to an alternate destination. Redirection or discarding of untimely data tends to reduce network loading associated with data delivery in such applications.

In some situations, users may wish to control user presence directly. For example, a user may wish to initiate an instant messaging application and remain invisible or otherwise change her actual status without changing the user presence data available to the application server and to other users. In addition, user presence data can be updated without accessing an associated application by, for example, updating user presence data based on a user command or a default instruction received from, for example, a mobile station. As a specific example, a user can enter a command such as "available" without initiating an application. In addition, users can configure presence data so that, for example, user presence is "available" for members of some buddy lists and "unavailable" to others. A user can also specific a destination for any selected presence status. For example, a user presence of "reachable" can be associated with message delivery to a desktop, instead of a mobile station. In addition, user presence data can be configured so that access to presence data for a particular user is generally denied to all users except for members of a user's buddy list. In some examples, user presence is updated by periodically polling mobile station or a desktop station.

User presence data can be used to determine if a user is available so that in an instant messaging application, a typing indicator can be delivered to a buddy or all members of a buddy list while a message is being composed. Other such message preparation indicators can also be provided.

User presence data obtained from, for example, an application presence server, can be used to determine if data should be delivered to a user at a specific destination, or if delivery should be cancelled due to lack of user presence, particularly for time sensitive data. Communication with a user can also be configured based on user activity data obtained at, for example, an application server or other network location. In a representative example, user actions based on a selected application (such as instant messaging, word processing, email, data communication, voice messaging) can be used to establish or update user activity status data. Such user activity status data is associated with network actions by the user based on actual network use by the user. Communication with other users and/or with applications can be based on user activity status data. For example, if user activity status data indicates that a user is repeatedly transferring data from a selected location, communication with the user can be delayed. In this example, the user appears busy with a selected task, and other activities are canceled or delayed.

In an instant messaging application, activity status data concerning the instant messaging application can be stored at, for example, a presence server or an application server. Such activity data can be used to determine if the user is available for instant messaging. For example, a presence server can record that a user has initiated the instant messaging application but a status record associated with the instant messaging application can indicate when and how often the instant messaging application has been used. A status record associated with a user who is nominally present in the application (based on, for example, a presence data repository) can be queried to determine if the application has been recently accessed. For example, one or more alerts can be sent to a user indicated as present but who has not accessed the application for predetermined time. If no response is received, the user presence can be changed to "present and inactive" and the status change directed to members of the user's buddy list. Alternatively, user presence can be changed to "absent."

Figure 13:
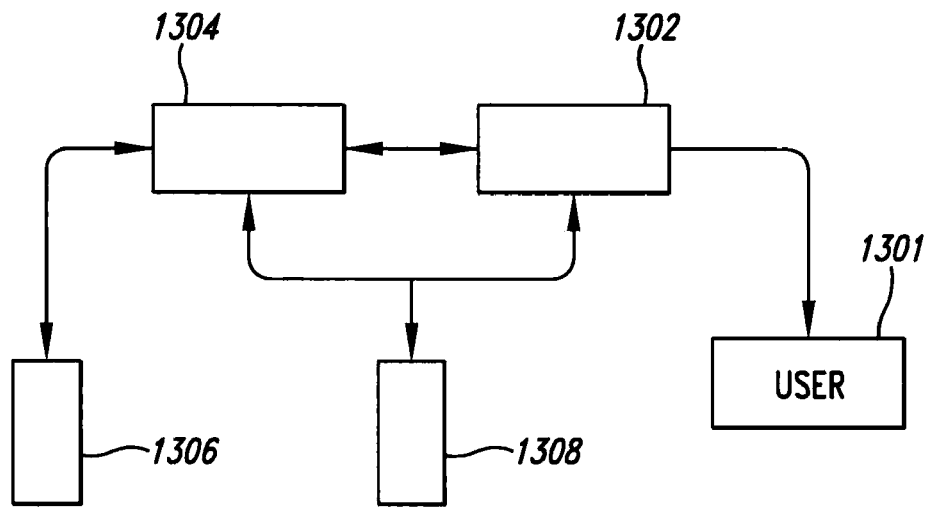
FIG. 13 is a block diagram of a communication system that includes a presence repository and an activity repository.
Figure 14A:
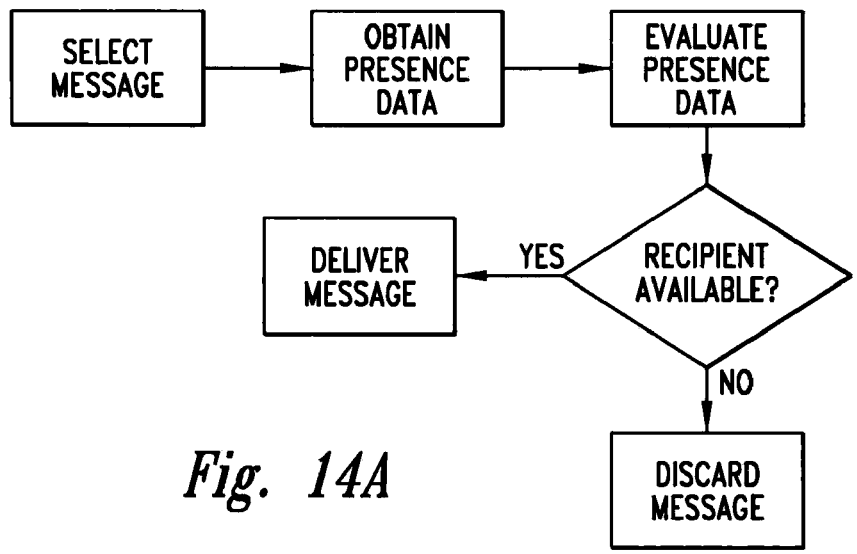
FIG. 14A is a diagram illustrating a messaging method that includes selecting a message for delivery to at least one selected recipient, evaluating application presence data associated with the recipient, and processing the messaging based on the evaluation.
Figure 14B:
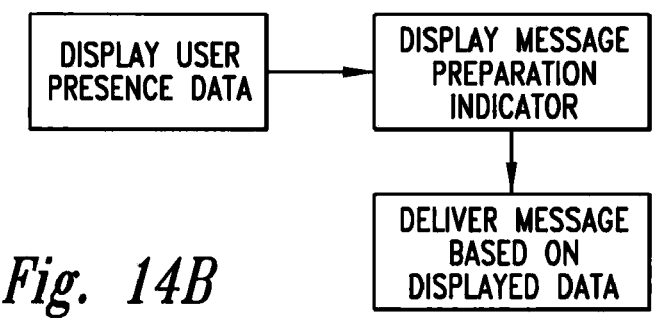
FIG. 14B is a diagram illustrating a messaging method that includes displaying user presence data for a list of recipients, delivering a message based on the displayed user presence data, and displaying a message preparation indicator associated with at least one recipient, wherein the message preparation indicator is associated with message preparation by the at one recipient.

With reference to FIG. 13, a user 1301 (for example, a desktop station and/or a mobile station) is in communication with an application server 1302. The application server 1302 processes application requests from the user 1301 and delivers application presence data concerning the user 1301 to an application server 1304. Application presence data is stored in, for example, an application presence repository 1306. User application requests (including application initiation and termination and other application requests) can be recorded as user activity data in a user activity repository 1308. The repositories 1306, 1308 can be configured so that presence data can be updated or otherwise configured based on activity data and/or activity data can be updated or otherwise configured based on presence data. In other examples, a single repository can be configured to receive activity and presence data, or such data can be stored at other network locations.

As noted above, user presence data can be based on initiation and termination of an application as well as other interactions of the user with the application. Such user activity status can be used to replace or modify user presence data, or user presence data can be configured based on configurable time periods of activity or inactivity. Examples are described above with reference to instant messaging, but presence data and activity status can be associated with other applications, including, for example, chat applications.

It will be apparent that the examples described above can be modified in arrangement and detail. We claim all that is encompassed by the appended claims.

I claim:

1. A network comprising:
   a first client configured to use a first application to receive a message associated with a message type;
   a second client configured to use a second application to send a message associated with an event time and the message type to the first client;
   a presence server; and
   an application server configured to communicate with the first client and detect use of the first application by the first client, and after detecting use of the first application by the first client, send application presence data associated with the first client and the first application to the presence server,
   the presence server being configured to receive the application presence data associated with the first client and the first application from the application server, and store the application presence data in a recipient activity status record associated with the first client and the first application,
   the application server being configured to receive the message from the second client and evaluate the recipient activity status record associated with the first client and the first application to determine whether the first client is unavailable to receive the message before the event time associated with the message, and if the first client is unavailable to receive the message before the event time associated with the message, reroute the message.

2. The network of claim 1, wherein at least one of the first client and the second client is a mobile client.

3. The network of claim 1, wherein the application server is configured to provide application presence data to an external application server.

4. The network of claim 1, wherein the application server is configured to provide application presence data to an external presence server.

5. The network of claim 1, wherein the presence server is configured to provide application presence data to an external presence server.

6. The network of claim 1, wherein if the first client is available to receive the message before the event time associated with the message, the application server is configured to route the message to the first client.

7. The network of claim 1, wherein rerouting the message comprises discarding the message.

8. The network of claim 1, wherein the recipient activity status record associated with the first client and the message type indicates how often or how recently the first application was accessed by the first client.

9. The network of claim 1, wherein the first client is configured to respond to an alert, the application server is configured to send an alert to the first client and receive a response therefrom, the application server is configured to send application presence data to the presence server determined as a function of the response received by the application server from the first client, and the presence server is configured to store the application presence data in the recipient activity status record associated with the first client and the first application.

10. The network of claim 1, wherein the first client is configured to send application presence data associated with the first client and the first application without use of the first application to the presence server and the presence server is configured to store the application presence data in the recipient activity status record associated with the first client and the first application.

11. The network of claim 1, wherein the application server is configured to send application presence data associated with the first client and the first application to the second client and the second client is configured to notify a user thereof whether the first client is available to receive the message.

12. The network of claim 1, further comprising a plurality of clients wherein the application server is configured to send application presence data associated with the first client and the first application to a predetermined portion of the plurality of clients.

13. The network of claim 12, wherein the predetermined portion of the plurality of clients are identified by a user of the first client.

* * * * *